United States Patent [19]
McLain et al.

[11] Patent Number: 6,123,015
[45] Date of Patent: Sep. 26, 2000

[54] OUTSIDE COOKING APPARATUS FOR BAKING FOOD

[75] Inventors: Joseph T. McLain, Syracuse; Gene R. Price, Pennellville, both of N.Y.

[73] Assignee: Leisure Cook Company, Syracuse, N.Y.

[21] Appl. No.: 09/220,476

[22] Filed: Dec. 23, 1998

Related U.S. Application Data

[60] Provisional application No. 60/068,805, Dec. 24, 1997.

[51] Int. Cl.[7] .............................. A47J 37/07; A47J 37/00
[52] U.S. Cl. .......................... 99/449; 99/450; 99/421 V; 126/25 R; 126/9 R
[58] Field of Search ................................. 99/421 V, 449, 99/450; 126/275 R, 273 R, 25 R, 9 R

[56] References Cited

U.S. PATENT DOCUMENTS

| | | | |
|---|---|---|---|
| 1,103,169 | 7/1914 | Beam | 126/9 R |
| 2,072,036 | 2/1937 | Horsman | 126/9 R |
| 3,699,876 | 10/1972 | Ellis | 99/259 |
| 4,777,927 | 10/1988 | Stephen et al. | 126/25 R |
| 5,720,272 | 2/1998 | Chiang | 126/25 R |
| 5,813,321 | 9/1998 | Bourgeois | 99/340 |

OTHER PUBLICATIONS

"Northern Response—Red Devil Grill" at www.northernresponse.com/store, printed Apr. 5, 1999.

"The Red Devil—Frequently Asked Questions" at www.northernresponse.com/images/Redvkfaq/html, printed Apr. 5, 1999.

*Primary Examiner*—Reginald L. Alexander
*Attorney, Agent, or Firm*—Kenneth J. Lukacher

[57] ABSTRACT

An outdoor cooking apparatus for baking food, is provided including a tray having a bottom surface with an inner section and an outer section which is separate from the inner section. Multiple legs are coupled to the tray to support the apparatus on the ground, or other substantially flat surface. A platter is disposed over at least a portion the inner section. The platter has a plate and a projecting member extending from the plate, or through an aperture in the plate, for supporting the food. A cylindrical upper member is provided having an interior cavity and an opening to this cavity at the bottom of the upper member. Through this opening, the upper member is positionable on the tray over the platter along either an annular gap between the inner and outer sections, or in the inner section. In another embodiment, the tray has an inner tray member on its bottom surface having a rim separating the inner and outer sections of the tray, and the upper member is positionable on the inner tray member in the inner section. With food supported on the platter and the upper member positioned on the tray, the food can be baked by placing heating material, such as charcoal or wood, in the outer section of the tray and igniting such material.

35 Claims, 7 Drawing Sheets

OUTSIDE COOKING APPARATUS FOR BAKING FOOD

This application claims the benefit of priority from now abandoned U.S. Provisional Application Ser. No. 60/068,805, filed Dec. 24, 1997.

DESCRIPTION

1. Field of the Invention

The present invention relates to an outdoor cooking apparatus (and method), and particularly to, an outdoor cooking apparatus which bakes food typically baked in an indoor oven appliance. The invention is especially useful for baking food outdoors using heating material traditionally used for outdoor cooking, such a charcoal or wood.

2. Background of the Invention

Traditionally, outdoor cooking has required a barbecue grill, which either broils or roasts, and baking is performed using an indoor oven appliance. To cook on a barbecue grill, food is set on a grill rack over hot coals. Accordingly, one would not bake on a barbecue grill since it does not provide an environment suitable for baking, such as provided by an indoor oven. However, it is often desirable to bake outside when either an indoor oven is unavailable, such as at a picnic, or to avoid unwanted heating of the interior of one's home by an indoor oven. Unfortunately, conventional outdoor grills or cookers do not offer means for baking food, such as poultry, meats, pork, cakes, breads, or cookies.

Furthermore, a barbecue grill requires supervision to assure the food is rotated for even cooking, and does not burn. If a grill is left unattended for too long, the food being grilled can overcook or burn. Accordingly, it is also desirable to provide methods and apparatus for cooking outdoors, which do not require supervision during the cooking process.

SUMMARY OF THE INVENTION

The principal object of the present invention is to provide an improved cooking apparatus which can bake food outdoors.

Another object of the present invention is to provide an improved cooking apparatus which bakes food outdoors, without such food being exposed to the fumes, dust, fire, or smoke from the charcoal or wood heating material used in the apparatus.

A still further object of the present invention is to provide an improved cooking apparatus which during baking of food, such as poultry or meat, collects the juices or drippings from the food and keeps such collected juices apart from the heating material used in the apparatus.

Yet another object of the present invention is to provide an improved cooking apparatus which during baking of food, such as poultry or meat, collects the juices or drippings from the food and separates the food from such collected juices.

A further object of the present invention is to provide an improved cooking apparatus which can be left unsupervised during the cooking process.

An even further object of the present invention is to provide an improved cooking apparatus for baking which is portable and can be easily transported.

Briefly described, the present invention provides an outdoor cooking apparatus including a circular tray having a bottom surface with inner and outer sections, where the outer section is separate from the inner section. A platter is provided disposed at a position over at least a portion of the tray's inner section. The platter has a plate and a projecting member, such as a spike, which extends from the plate to support the food. A cylindrical upper member is provided having an interior cavity and an opening to this cavity at the bottom of the upper member. Through this opening, the upper member is positionable on the tray over the platter.

A pair of annular ridges in the bottom surface of the tray may be provided to separate the inner and outer sections from each other, such that the opening of the upper member is positionable in an annular gap formed between the ridges in the tray. A single annular ridge may also be used to separate the inner and outer sections, in which the opening of the upper member is positionable over the platter in the tray's inner section. The platter has a base which may be releasably attachable to the tray.

In another embodiment, the tray has a circular inner tray member which is substantially smaller than the tray and located upon the bottom surface of the tray. The inner tray member has a rim separating the inner and outer sections of the tray from each other in which the inner section is defined by the bottom surface of the inner tray member. In this embodiment, the platter has a plate having a central aperture and a projecting member, such as a spike, which extends through that aperture. One end of the projecting member supports the food, while its other end rests on the bottom surface of the inner tray member in the tray's inner section. Spacing elements on the bottom of the plate may be used to support the plate above the tray and the inner tray member. With the projecting member extending through the plate's aperture, lower sections of the projecting member may extend outward beneath the plate to support the plate above the tray and the inner tray member. The upper member is positionable over the platter in the tray's inner section, preferably near the rim of the inner tray member.

The method of the invention may be carried out by positioning the platter on the tray above the inner section and then placing food, such as poultry, beef or pork, on the projecting member. Through the opening of the upper member, the upper member is positioned over the platter on the tray. Heating material, such as charcoal or wood, is then placed in the outer section of the tray and ignited. The food bakes on the platter in the cavity of the upper member. During baking, the juices or drippings from the food are collected in the inner section of the tray, while the platter supports the food above the collected juices. This keeps the collected juices from the heated material in the outer section of the tray. When the food is finished baking, the upper member is removed from the tray, and then the baked food removed from the projecting member.

The term food is used in this description to refer specifically to poultry, beef, pork, or other types of meat which is supportable on the projecting member of the platter, and generally to any food item which can be baked on the platter with or without the spike.

BRIEF DESCRIPTION OF THE DRAWINGS

The foregoing objects, features and advantages of the invention will become more apparent from a reading of the following description in connection with the accompanying drawings, in which.

DETAILED DESCRIPTION OF THE INVENTION

Figure 1:
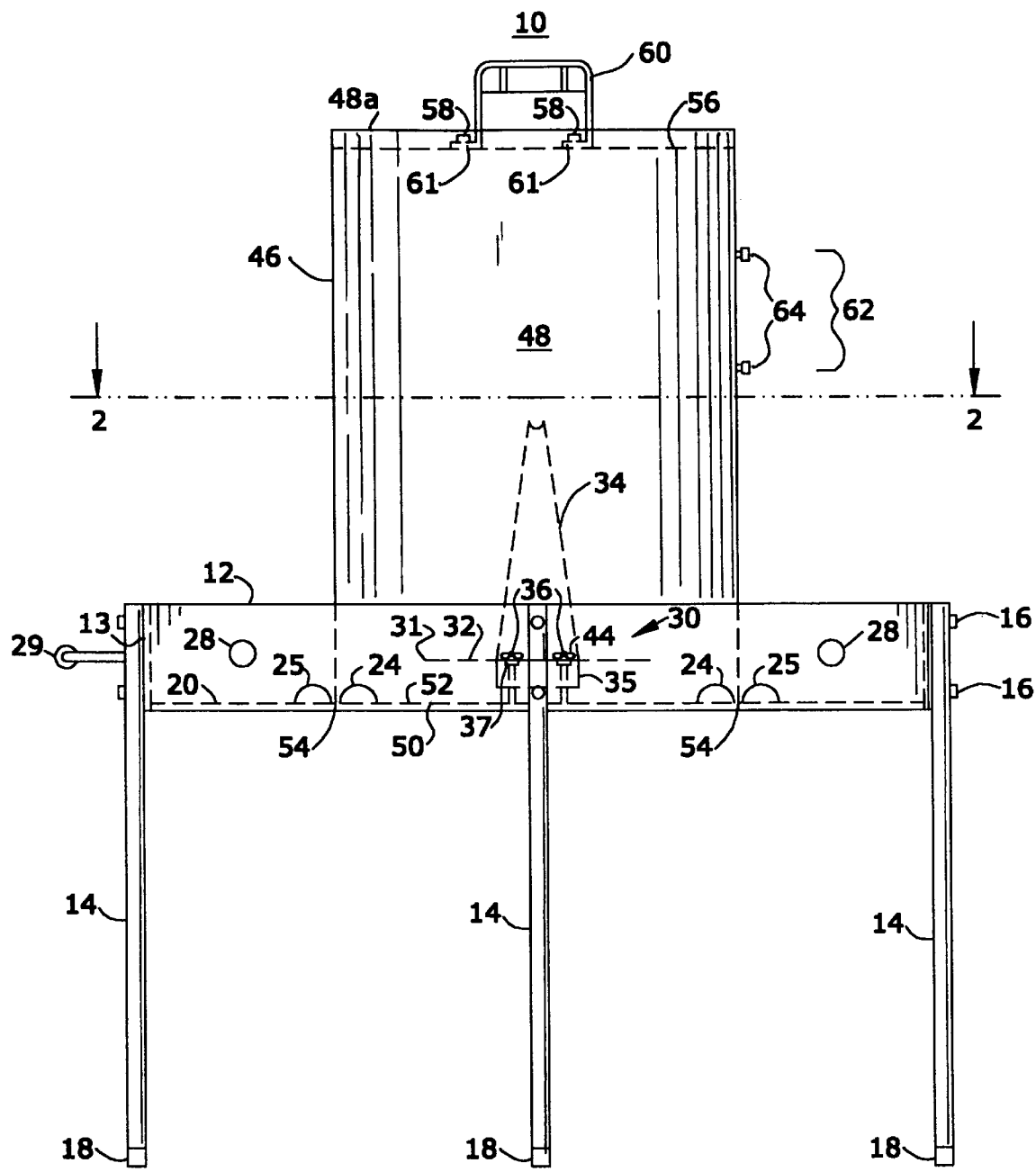
FIG. 1 is a block diagram of the apparatus in accordance with the present invention.
Figure 2:
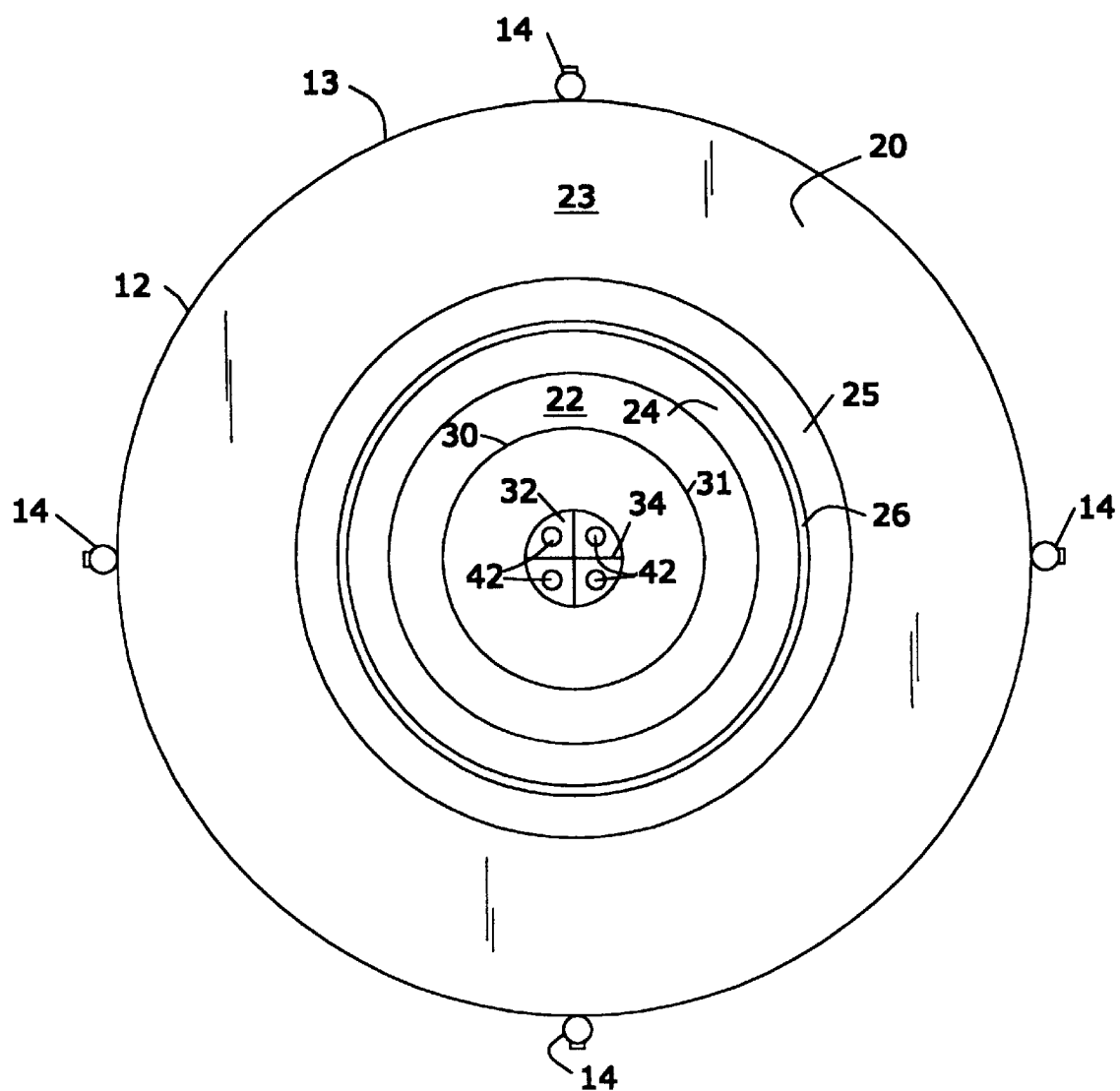
FIG. 2 is a sectional view along line 2—2 in FIG. 1.

Referring to FIGS. 1 and 2, apparatus 10 is shown for baking food outdoors having a circular tray 12 with multiple legs 14 for supporting the apparatus on the ground or other substantially flat surface. Legs 14 are attached to the circumferential side 13 of the tray and are equally spaced about the circumference of the tray. For example, the tray may be approximately 67 inches in circumference, 22 inches in diameter, and 3 inches in height along side 13. The tray and legs may be made of a rigid metal material, such as typically used in outdoor charcoal grills. Legs 14 are attached to tray 12 by fasteners 16, such as screws or bolts with respective nuts, or other similar fastening means. For example, legs 14 may be approximately one inch in diameter and 14 inches in length. Four legs 14 may be used. Only three legs are shown in FIG. 1 for purposes of illustration. Each leg 14 has an end cap 18 at its free end to reduce movement of the apparatus 10 during cooking or storage. Caps 18 may be composed of a non-skid material of durable plastic.

As best shown in FIG. 2, tray 12 has a bottom surface 20 having an inner section 22 and an outer section 23 which are separated from each other by a pair of annular ridges 24 and 25. Annular ridges 24 and 25 represent two regions which protrude from bottom surface 20 at two different radii from the center of tray 12. Ridges 24 and 25 are of equal width, but may be of different widths, if desired. The inner section 22 represents the area of the tray 12 within ridge 24, and the outer section 23 represents the area of the tray between ridge 25 and side 13 of the tray. For example, each annular ridge 24 and 25 may be approximately a half inch in height and one inch in width, where the center of ridge 24 is approximately 6.2 inches from side 13 of the tray. Each annular ridge 24 and 25 is joined to the bottom surface 20, such as by welding, or may be impressed into the bottom surface 20 of the tray. An annular gap 26 is formed between ridges 24 and 25 at the bottom surface of the tray, and, for example, may be a quarter inch wide. In the alternative, ridges 24 and 25, and the gap, may be provided by a single assembly attached to bottom surface 20. In a further alternative, only a single ridge 25 is provided on tray 12 to separate outer section 23 and inner section 22, which in this case is the area of tray within ridge 25.

The tray 12 also has multiple vent holes 28, such as six, located in the side 13 of the tray 12 which are equally spaced from each other about the circumference of the tray. Holes 28 may be approximately a quarter inch in diameter and two inches high relative to the bottom surface 20. Two or more handles 29 may be attached to side 13 of the tray 20 to allow ease of handling. Only one handle 29 is shown in FIG. 1 for purposes of illustration.

Figure 3A:
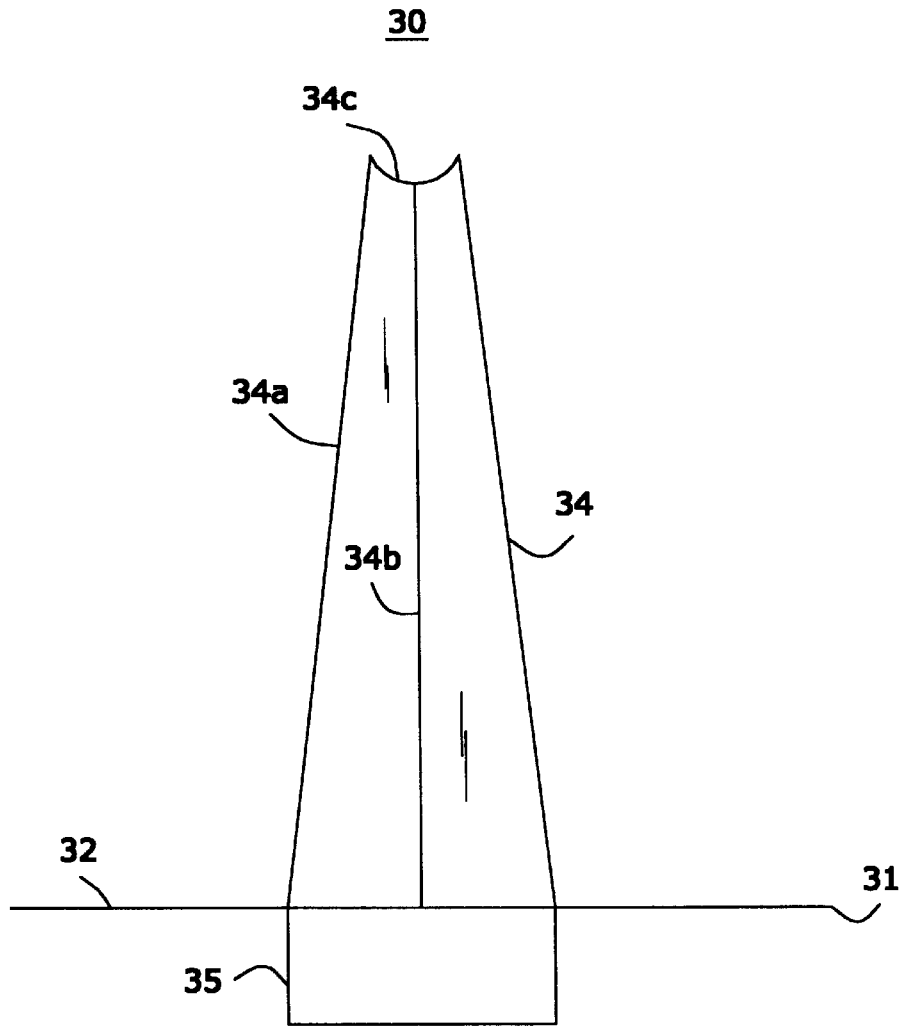
FIG. 3A is a block diagram of the platter of FIG. 1.

Apparatus 10 further has a platter 30. Platter 30 has a plate 31 with a circular surface 32, and a projecting member or spike 34 from surface 32. Platter 30 is shown in FIGS. 2 and 3A, and in FIG. 1 in dashed lines. Spike 34 decreases in diameter as it extends from surface 32, and is positioned about the center of plate 31. Preferably, spike 34 is composed of two cut sheets 34a and 34b of material, such as metal, to form a star shaped structure when viewed from the top of tray 12. Spike 34 may be welded to the plate 31. One or both sheets 34a and 34b may have an optional concave upper edge 34c. Projecting member 34 may represent any tapered conical shaped structure which can support food on plate 31. Platter 30 also has a base 35 attached to plate 31. For example, spike 34 may be approximately 5.5 inches in height, two inches in width at its bottom, and tapered to 0.75 inches at its top, while plate 31 is approximately four inches in diameter and approximately one inch from the bottom of base 35.

Figure 3B:
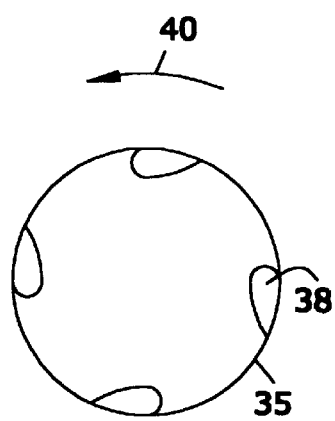
FIG. 3B is a partial view from the bottom of the platter of FIG. 3A.

A locking mechanism releasably attaches platter 30 to tray 12 such that plate 31 is at a position spaced above at least a portion of the inner section 22 of the tray. For example, plate 31 may be approximately two inches from bottom surface 20 above inner section 22. This locking mechanism includes four tear dropped openings 38 in base 35 of platter 30, as best shown in FIG. 3B, and four holes 42 (FIG. 2) in platter 30 which extend through surface 32. The locking mechanism further includes four externally threaded pins or bolts 36 extending from the bottom surface 20 of the tray. Each pin 36 has a fixed stop or spacer 37 about the desired distance of plate 31 from bottom surface 20. Threaded wing-nuts 44 can be received on pins 36 and tightened up to the stop 37 on their respective pin. Only two of these pins 36 are shown in FIG. 1. Although four pins are described, more or fewer number of pins may be used with a corresponding number of tear drop shaped openings 38.

To lock platter 30 to tray 12, the platter 30 is positioned above the center of the tray 12, such that pins 36 are positioned near openings 38, the platter is then turned counterclockwise (as indicated by arrow 40) until the pins are positioned completely within openings 38. When properly positioned in openings 38, the pins 36 will be registered to holes 42 in the platter 30. The ends of pins 36 are passed through holes 42, and then a wing nut 44 is threaded over the ends of each of the pins 36 and turned until tight, thereby locking the platter 30 to tray 12. A washer may be provided between each wing nut 44 and surface 32 of plate 31. When properly positioned, plate 31 is fixed between spacers 37 and wing-nuts 44 along pins 36, and surface 32 of plate 31 is approximately parallel with the bottom surface 20 of tray 12. Platter 30 may be unlocked from the tray by turning the wing-nuts 44 such that they can be removed from pins 36, and then lifting platter 30 from tray 12. Removal of platter 30 may be facilitated by turning the platter 30 in the opposite direction of arrow 40 after pins 36 are no-longer in holes 42. Other mechanisms for releasably attaching platter 30 to tray 12 may also be used.

The apparatus further includes an upper cylindrical member 46 having an interior cavity 48 and a closed top 48a. An opening 52 to cavity 48 is provided through the bottom 50 of member 46. Upper member 46 provides a continuous edge 54 along opening 52 which is positionable in the gap 26 formed between ridges 24 and 25, or if only single ridge 25 is provided, positionable in the inner section 22 of the bottom surface 20 of tray 12. For example, upper member 46 may be approximately 36 inches in circumference, 11.5 inches in diameter, and 13.75 inches in height. Upper member 46 is preferably composed of material, such as metal, which can withstand temperatures associated with typical baking. Similarly, platter 30 is composed of material, such as metal, which can also withstand the temperatures associated with typical baking. At least a portion of top 48a of upper member 46 may have a depressed surface or recess 56. Recess 56 may be approximately ⅜ inches from the surface of top 48a. The upper member 46 thus may represent an enclosed cover, except for opening 52, which can cover the platter 30.

Slots 58 may be provided external of top 48a for attaching a handle 60 having ends 61 which can slide into such slots. Ends 61 may be shaped to frictionally engage slots 61. Thus, handle 60 may be easily attached and detached from cylindrical member 46. Alternate sites may be provided for attaching handle 60 to member 46, for example, site 62 may be provided on the outside circumferential surface of member 46 for attaching handle 60 via slots 64. The handle 60 may be stored at site 62 during cooking.

In practicing the method of the invention, platter 30 is attached (and locked) to tray 12 as described earlier, and then food, such as poultry, beef, or pork, is placed on spike 34. Specifically, whole poultry can be placed on spike 34 via the inner cavity of the poultry, while for beef or pork, a slit is first made in the meat and the meat is slid onto the spike 34 via this slit. Using handle 60 in slots 58, upper member 46 through its opening 52 is positioned over platter 30 such that edge 54 lies within gap 26 between the ridges 24 and 25 to form a substantial air tight seal, or if a single ridge 25 is provided, positioned over platter 30 such that edge 54 rests on the inner section 22 of the tray 12, preferably near ridge 25. Spike 34 of the attached platter 30 is approximately centered along the longitudinal axis of upper cylindrical member 46. Heating material, such as charcoal or wood, is then placed in the outer section 23 of the tray and ignited. Vent hole 28 provide additional air to the heating material. Within the enclosure formed by cavity 48 on tray 12, a baking environment, similar to an oven, is created by the heat from the heating material outside this environment. The food thus bakes on the platter 30 within this cavity 48 without the food being exposed to the fumes, dust, fire, or smoke associated with the heating material (or any fire starting chemicals applied to such material).

During baking, the juices or drippings from the food are collected in the inner section 22 of the tray, while the platter 30 supports the food above the collected juices. The pair of ridges 24 and 25 represent two dams, or ridge 25 represents a single dam if only a single ridge 25 is provided, to keep the collected juice in the inner section 22 of the tray from the heated material in the outer section 23 of the tray. As the food bakes, it may shrink and slide down spike 34 toward surface 32 of the platter. In addition, recess 56 of cylindrical member 46 may serve as a hot surface onto which a pot may be placed containing other food item which may require heating. Other items may also be directly heated on this hot surface. Handle 60 may be detached from upper member 46 during baking to avoid heating of the handle. Further, handles 29 may be used to move apparatus 29 during baking, if necessary.

During cooking, apparatus 10 does not need supervision by an attendant, in contrast to other forms of outdoor cooking, such as grilling.

Generally, when the heating material is exhausted, the food is finished baking. For example, 8 lbs. of charcoal can bake a 13 lbs. turkey in about 1 hour and 45 minutes, which is much faster than baking in a typical indoor oven. After baking is completed, handle 60 is attached to the upper member 46 if detached during baking, and using this handle, the upper member is removed from tray 12. The baked food can then be removed from the spike 34.

The platter 30, i.e., projecting member 34 and plate 31, preferably have a non-stick coating, such as Teflon, to facilitate cleaning when the platter is detached from the tray.

In the alternative, platter 30 may be provided without spike 34, such that surface 32 can be used for baking other types of food, such as cakes, bread, or cookies, which do not require spike 34 for support. Surface 32 of platter 30 can be shaped similarly to a pan for baking, or a separate baking pan may be applied onto top of surface 32. Thus, baking typically done in an indoor oven can be performed outdoors using apparatus 10.

Apparatus is portable, and can easily separate into three major components, tray 12 with legs 14, platter 30, and upper member 46, for storage or transportation. This may be further facilitated by providing legs 14 which are foldable or collapsible.

In the alternative, the heating material may be provided by a propane heating mechanism similar to those used in typical propane operated grills. A thermometer (not shown) may also be attached to upper member 46 if monitoring of temperature within member 46 is desired.

Figure 4:
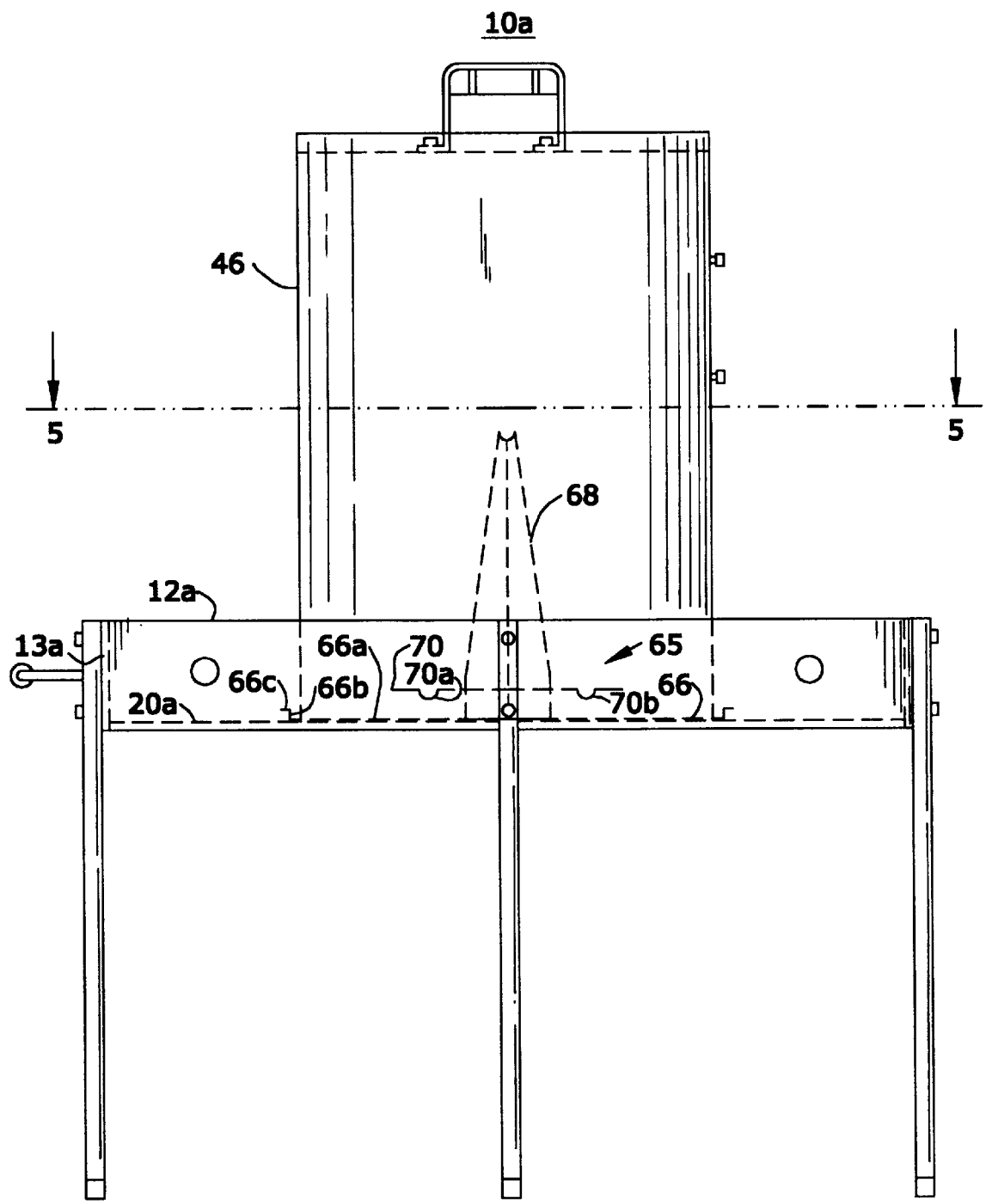
FIG. 4 is a block diagram of another embodiment of the apparatus in accordance with the present invention.
Figure 5:
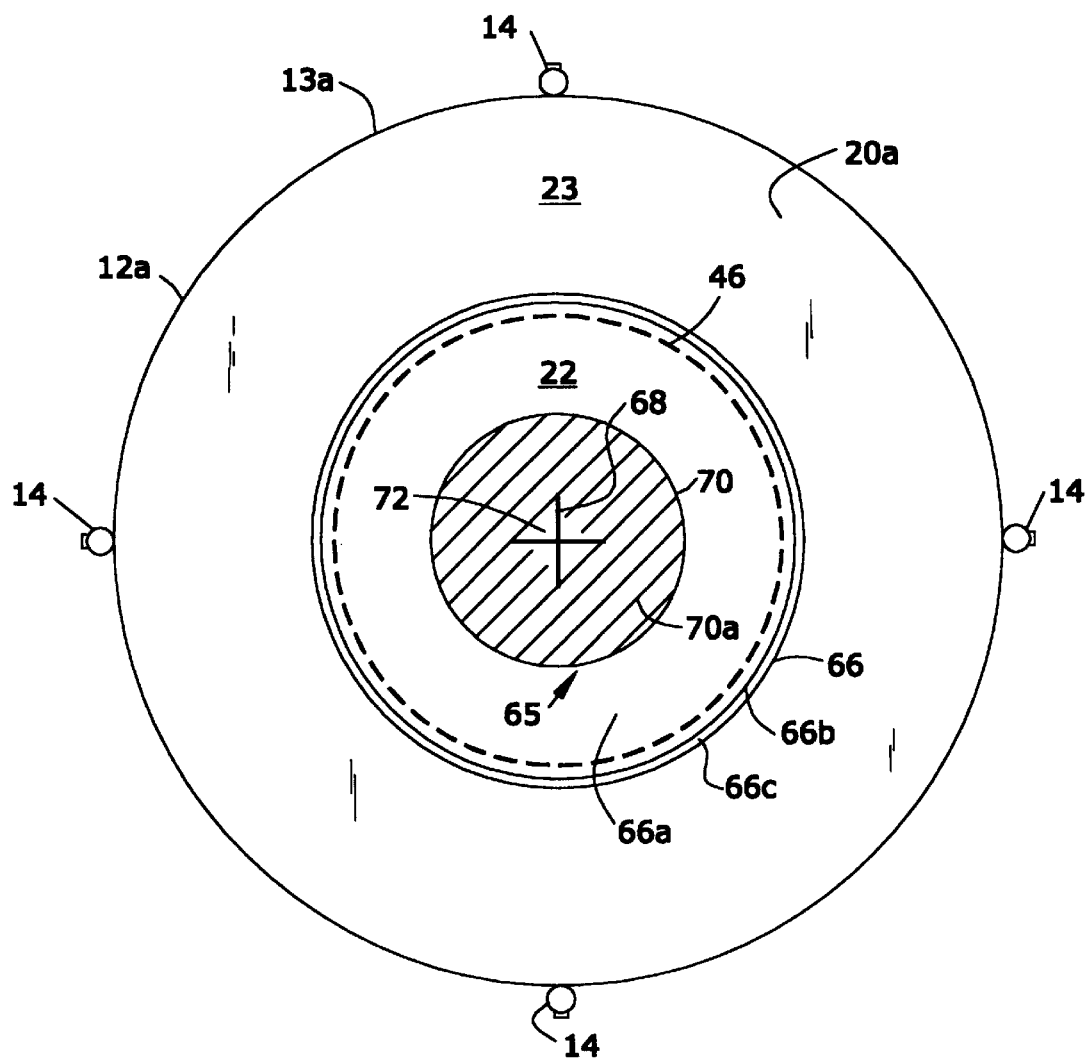
FIG. 5 is a sectional view along line 5—5 in FIG. 4.

Referring to FIGS. 4 and 5, another embodiment of the outdoor cooking apparatus of the present invention is shown. Apparatus 10a of this embodiment has a tray 12a which is similar to tray 12, except that tray 12a has on its bottom surface 20a a removable inner tray member 66, and annular ridges 24 and 25 and pins 36 are absent. Inner tray member 66 has a bottom surface 66a and an annular rim or edge 66b. Rim 66b may have an optional lip 66c extending outward from the top of the rim. The inner tray member 66 may be circular and composed of metal, such as aluminum. Inner tray member 66 is substantially smaller than tray 12a. For example, inner tray member 66 may be 12 inches in diameter and rim 66b may have a height from bottom surface 66a of approximately half an inch, similar to that of a typical low rim circular aluminum pan. The rim 66b of inner tray 66 separates the outer section 23 of the tray 12a from the inner section 22 of tray 12a, where the inner section 22 is defined by the area within inner tray member 66, and the outer section 23 is defined by the area of tray 12a between rim 66b and tray side 13a. The inner tray 66 requires a diameter sufficient to allow opening 52 of upper member 46 to be positionable at its edge 54 on the bottom surface 66b, preferably near rim 66b, as denoted by the dashed line in FIG. 5.

Figure 6:
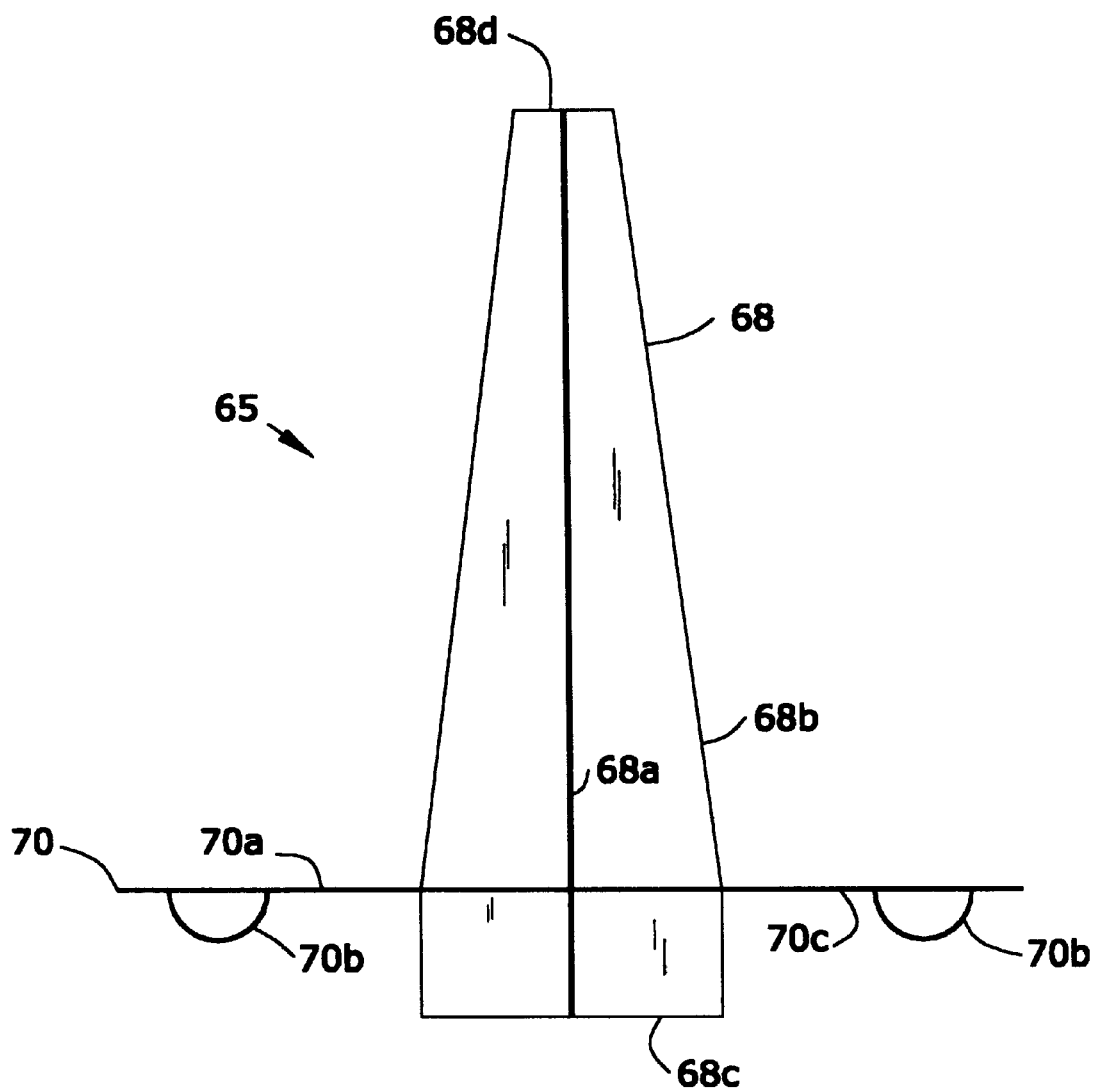
FIG. 6 is a block diagram of the platter of FIG. 4.
Figure 7A:
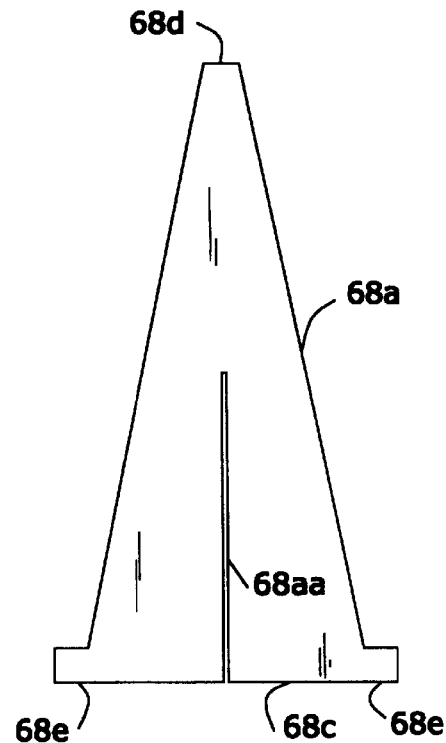
FIGS. 7A and 7B shows the two part assembly of the spike of the platter of FIGS. 4–6.
Figure 7B:
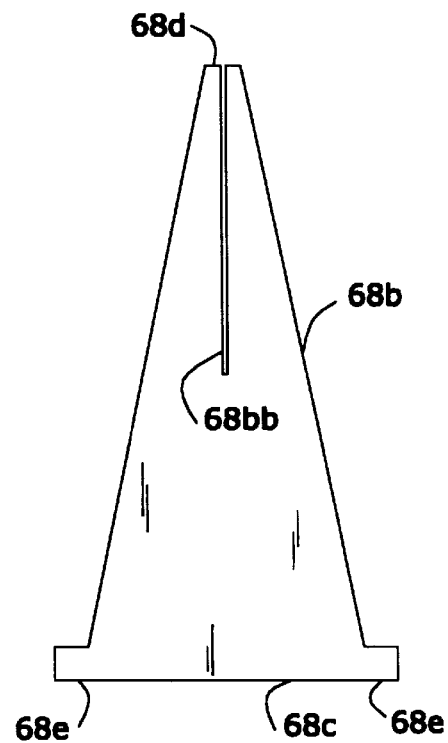

Apparatus 10a further includes a platter 65 which has a projecting member or spike 68, and a plate 70 having a surface 70a. The dimensions of spike 68 from surface 70a of plate 70 may be similar to that of spike 34 of apparatus 10, and the dimensions of plate 70 may be similar to plate 31 of apparatus 10. Platter 65 is best shown in FIGS. 6, 7A and 7B. Spike 68 is composed of two cut out metal sheets 68a and 68b which slide perpendicular into each other at slots 68aa and 66bb, respectively, to form a tapered star-shaped structure which decreases in diameter as it extends upwards. The lower end 68c of spike 68 lies on the bottom surface 66a of inner tray member 66 at the approximate center of the tray 12a. Food may be received on upper end 68d of spike 68.

Figure 8:
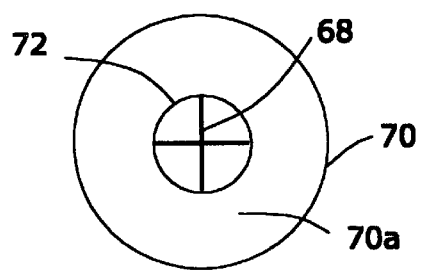
FIG. 8 is diagram of the platter of FIG. 4 in which the plate of the platter is continuous except for a central aperture through which extends the spike of the platter.

Plate 70 has a central aperture or opening 72 through which spike 68 extends. The plate 70 may be continuous along surface 70a, except for central aperture 72, or plate 70 may represent a circular grill having surface 70a provided by parallel bars attached to a circular frame in which the bars near the center of the grill are discontinuous to define central aperture 72 through which spike 68 is received. As a grill, plate 70 may be metal and similar to a typical grill used in outdoor cooking. For purposes of illustration, plate 70 is shown as a grill in FIG. 5, and shown continuous in FIG. 8 but for aperture 72. The size of the aperture 72 may correspond approximately with the circumference of spike at the desired height of the plate 70 from bottom surfaces 66a or 20a. Multiple spacer elements 70b are attached to the bottom of plate 70 to assure that the plate is spaced at the desired distance from the bottom surface 66a of inner tray member 66 and bottom surface 20a of tray 12a. The spacers 70b may be metal and attached, such as welding or by screws, to the bottom surface 70c of plate 70. For example, the spacers 70b provide a distance of approximately half an inch from inner tray member 66. When plate 70 is a grill, spacers 70b may be provided by downward bends in the bars of the grill, such as four bends symmetric about aperture 72. Optionally, aperture 72 of plate 70 is sized such that when spike 68 extends through the aperture 72 of plate 70, the bottom surface 70c of plate 70 near the aperture rests on lower, outwardly extending sections 68e of spike 68 (FIGS. 7A and 7B). Sections 68e may be used instead of spacers 70b, or in combination therewith. The height of sections 68e may correspond to the height of spacers 70b to further support plate 70 above inner tray member 66 and tray 12a. Other than tray 12a and platter 65, apparatus 10a is identical to apparatus 10.

The method of using apparatus 10a is similar to that described earlier for apparatus 10 in which heating material is placed in the outer section 23, food is slid onto spike 68 on platter 65, and the edge 54 of upper cylindrical member 46 is positioned along the inside of the rim 66b, such that the juices or drippings from the food during baking are collected in the inner tray member 66 (i.e., in the inner section 22 of tray 12a).

From the foregoing description, it will be apparent that there has been provided an apparatus and method for baking food outdoors. Variations and modifications in the herein described apparatus and method in accordance with invention will undoubtedly suggest themselves to those skilled in the art. Accordingly, the foregoing description should be taken as illustrative and not in a limiting sense.

What is claimed is:

1. An outdoor cooking apparatus for baking food comprising:
    a tray having a bottom surface in which said bottom surface has an inner section and an outer section separate from said inner section;
    a platter disposed over at least a portion of said inter section of said tray capable of supporting food; and
    an upper member having all interior cavity and an opening to said cavity through which said upper member is positionable on said tray over said platter, in which heating material is locatable in said outer section.

2. The apparatus according to claim 1 wherein said platter has a projecting member on which said food can be supported.

3. The apparatus according to claim 1 wherein said platter comprises a surface having a projecting member extending from the surface for supporting the food on said platter.

4. The apparatus according to claim 1 further comprising means for releasably attaching said platter to said tray.

5. The apparatus according to claim 4 wherein said platter has a base, and said attaching means comprising one or more bolts extending from the bottom surface of said tray, one or more openings in said base of said platter through which said bolts can be received, and one or more nuts positionable over said bolts to lock said platter to said tray when said openings in said base of said platter receives said bolts.

6. The apparatus according to claim 1 wherein said platter comprises one of a plate and a pan having a surface spaced a distance above said tray.

7. The apparatus according to claim 1 wherein said bottom surface of said tray further comprises a pair of ridges for separating said inner and outer sections from each other and a gap formed between said ridges, in which said upper member is positionable along said opening in said gap.

8. The apparatus according to claim 1 wherein said inner section of said tray provides an area for collecting drippings from said food during cooking.

9. The apparatus according to claim 1 wherein said platter comprises a surface for baking food.

10. The apparatus according to claim 1 wherein said upper member is cylindrical.

11. The apparatus according to claim 1 wherein said upper member has one or more exterior slots through which a handle can be received.

12. The apparatus according to claim 1 wherein said upper member comprises a top having a surface with a recessed area.

13. The apparatus according to claim 2 wherein said projecting member has a tapered conical-shaped surface.

14. The apparatus according to claim 2 wherein said projecting member represents a spike having a star-shaped structure.

15. The apparatus according to claim 1 further comprising legs attached to said tray for supporting said tray on a substantially flat surface.

16. The apparatus according to claim 6 wherein said plate has a discontinuous surface.

17. An outdoor cooking apparatus for baking food comprising:
    a tray having a bottom surface in which said bottom surface has an inner section and an outer section separate from said inner section;
    a platter disposed over at least a portion of said inter section of said tray for supporting said food; and
    an upper member having an interior cavity and an opening to said cavity through which said upper member is positionable on said tray over said platter, wherein said platter comprises a plate having an aperture and a projecting member extending through said aperture in which said projecting member has one end over which food can be supported and another end on said inner surface of said tray.

18. The apparatus according to claim 17 wherein said plate has a plurality of spacer elements supporting said plate above said bottom surface of the tray.

19. The apparatus according to claim 17 wherein said projecting element has outwardly extending sections which support the plate near said aperture over said bottom surface of the tray.

20. The apparatus according to claim 17 wherein said plate represents a grill.

21. An outdoor cooking apparatus for baking food comprising:
    a tray having a bottom surface in which said bottom surface has an inner section and an outer section separate from said inner section;
    a platter disposed over at least a portion of said inter section of said tray for supporting said food; and
    an upper member having an interior cavity and an opening to said cavity through which said upper member is positionable on said tray over said platter, wherein said bottom surface of said tray further comprises at least one ridge for separating said inner and outer sections from each other.

22. An outdoor cooking apparatus for baking food comprising:

a tray having a bottom surface in which said bottom surface has an inner section and an outer section separate from said inner section;

a platter disposed over at least a portion of said inter section of said tray for supporting said food; and an upper member having an interior cavity and an opening to said cavity through which said upper member is positionable on said tray over said platter, wherein said tray further comprises an inner tray member located on said bottom surface of said tray, said inner tray member having a bottom surface and a rim which separates said inner and outer sections from each other, and said inner tray member defines said inner section.

23. The apparatus according to claim 22 wherein said upper member is positionable along said opening on said inner tray member.

24. The apparatus according to claim 22 wherein said platter comprises a plate having an aperture and a projecting member extending through said aperture in which said projecting member has one end over which food can be supported and another end over said inner surface of said tray.

25. The apparatus according to claim 22 wherein said inner tray member is removable from said first tray.

26. An outdoor cooking apparatus for baking food comprising:

a tray having a bottom surface in which said bottom surface has an inner section and an outer section separate from said inner section;

a platter disposed over at least a portion of said inter section of said tray for supporting said food; and an upper member having an interior cavity and an opening to said cavity through which said upper member is positionable on said tray over said platter, wherein said outer section of said tray has means for producing heat.

27. An outdoor cooking apparatus for baking food comprising:

a tray having a bottom surface in which said bottom surface has an inner section and an outer section;

a platter disposed over at least a portion of said inner section of said tray; and an upper member having an interior cavity and an opening to said cavity through which said upper member is positionable on said bottom surface of said tray over said platter between said inner section and said outer section.

28. The apparatus according to claim 27 wherein said platter further comprises one of a continuous plate and spike assembly, a grill and spike assembly, or a pan.

29. A method of outdoor baking comprising the steps of:

providing a tray having a bottom surface with an inner section and an outer section separate from said inner section;

positioning a platter above at least a portion of said inner section of said tray;

placing food on said platter;

positioning a covering member having a cavity on said tray over said inner section and said platter through an opening to said cavity of the covering member;

applying heat within said outer section to said covering member for baking said food on said platter; and removing said covering member from said tray and said food from said platter when said food is baked.

30. The method according to claim 29 wherein said platter comprises a projecting member for supporting said food on said platter.

31. The method according to claim 29 wherein said step of positioning said platter further comprises the step of attaching said platter to said base.

32. The method according to claim 29 wherein said tray providing step further comprising the step of placing an inner tray member inside said tray, in which the inner tray member has a rim separating the inner and outer sections from each other, and said inner tray member defines said inner section.

33. The method according to claim 32 wherein said platter represents a projecting member and a plate, and said method further comprises assembling the platter such that the projecting member extends through an aperture of said plate over said inner section.

34. The method according to claim 29 wherein said platter comprises one of a continuous or discontinuous surface.

35. The method according to claim 33 wherein said plate represents a grill.

* * * * *